Feb. 21, 1967  R. A. FUNK ETAL  3,304,919
CHEMICAL RECOVERY UNIT
Filed Dec. 29, 1965  2 Sheets-Sheet 1

INVENTOR.
ROBERT A. FUNK
JAMES JONAKIN
BY
Eldon H. Luther
ATTORNEY

Feb. 21, 1967 R. A. FUNK ETAL 3,304,919
CHEMICAL RECOVERY UNIT
Filed Dec. 29, 1965 2 Sheets-Sheet 2

INVENTOR.
ROBERT A. FUNK
JAMES JONAKIN
BY
Eldon H. Luther
ATTORNEY

United States Patent Office 3,304,919
Patented Feb. 21, 1967

3,304,919
CHEMICAL RECOVERY UNIT
Robert A. Funk, Hazardville, and James Jonakin, Simsbury, Conn., assignors to Combustion Engineering, Inc., Windsor, Conn., a corporation of Delaware
Filed Dec. 29, 1965, Ser. No. 517,304
5 Claims. (Cl. 122—7)

This invention relates generally to chemical recovery units employed in the pulp and paper industry wherein the so-called black liquor produced from the kraft pulping process is introduced into a furnace with the burnables in this liquid being burned therein and with the non-burnable chemicals being smelted and thus recovered. These recovery units are steam generators, the furnaces of which are lined with steam generating tubes, and this invention is concerned with an improved recovery unit operating at a relatively high steam pressure with specific precautions being taken to prevent tube deterioration in the lower-most region of the furnace.

There has, in recent years, been a trend in the design and use of chemical recovery units to increase the pressure of the unit, i.e., the pressure of the steam produced by the unit for use in various processes and apparatus within the pulping and paper making plant. As a result of this increase in pressure, the metal temperature of the steam generating tubes that line the furnace of the chemical recovery unit has, accordingly, increased. It has been found that at steam pressures at approximately 900 pounds per square inch and above there develops a serious problem with regard to metal wastage of the steam generating tubes in the lowermost region of the furnace, i.e., in the region below the primary air ports. The present invention overcomes this problem by providing, in a particular manner, a protective layer over the portion of the tubes in this region exposed to the furnace interior.

In the operation of these chemical recovery units the black liquor is sprayed into the furnace at a location spaced well above the bottom of the furnace. This liquor has a substantial moisture content and most of this moisture is driven from the liquor spray upon its introduction into the furnace because of the high temperature in the furnace and the hot gases passing upwardly through the furnace and the spray. The solids that remain after thus removing the moisture fall onto the bottom or hearth of the furnace and form a roughly truncated pile. During the descent to the hearth some of the lighter volatiles are driven from these solid particles and the remaining volatiles are liberated and the combustible material in the solids burned in this pile with this combustion being supported by the introduction of primary air at locations spaced somewhat above the bottom of the furnace. This air is introduced through ports such that it is directed generally over and upon the pile of material. Some burnables are carried up through the furnace and are consumed above the location of liquor introduction with the secondary air being introduced for this purpose.

The most severe operating conditions insofar as deterioration of the tube metal that lines the furnace walls is encountered occur at the location immediately below the primary air introduction ports. A high rate of heat absorption is present at this location and, accordingly, the tube metal temperatures on the furnace walls tend to be higher at this location than at other locations. Furthermore, there is at this location an interface or juncture between the burning material disposed on the furnace floor and the side walls of the furnace.

In order to provide a satisfactory and economic solution to the problem of tube metal wastage at the location below the primary air ports, there is provided, in accordance with the present invention, on the steam generating tubes lining the side walls of the furnace at this location a layer of refractory material. This layer of refractory material is held in place against the surface of the tubes by means of a metallic sheet-like material, such as expanded metal. It is essential that this expanded metal be of stainless steel such that it will resist corrosion when the refractory is sufficiently worn away to expose this metal to the furnace interior. It is further essential that this metal be secured to the tubes a numerous locations throughout its area and that it be so arranged that the refractory material which is applied to the tubes in a paste-like form may flow in back of portions of this metal to thus securely lock it in place.

Accordingly, it is an object of the present invention to provide an improved chemical recovery unit operating at a steam pressure of approximately 900 pounds per square inch or above.

A further object of the invention is to provide such an improved chemical recovery unit wherein specific precautions are taken to prevent tube metal wastage of the steam generating tubes in the region of the furnace below the primary air ports.

Other and further objects of the invention will become apparent to those skilled in the art as the description proceeds.

With the aforementioned objects in view, the invention comprises an arrangement, construction and combination of the elements of the inventive organization in such a manner as to attain the results desired, as hereinafter more particularly set forth in the following detailed description of an illustrative embodiment, said embodiment being shown by the accompanying drawings wherein.

Figure 1:
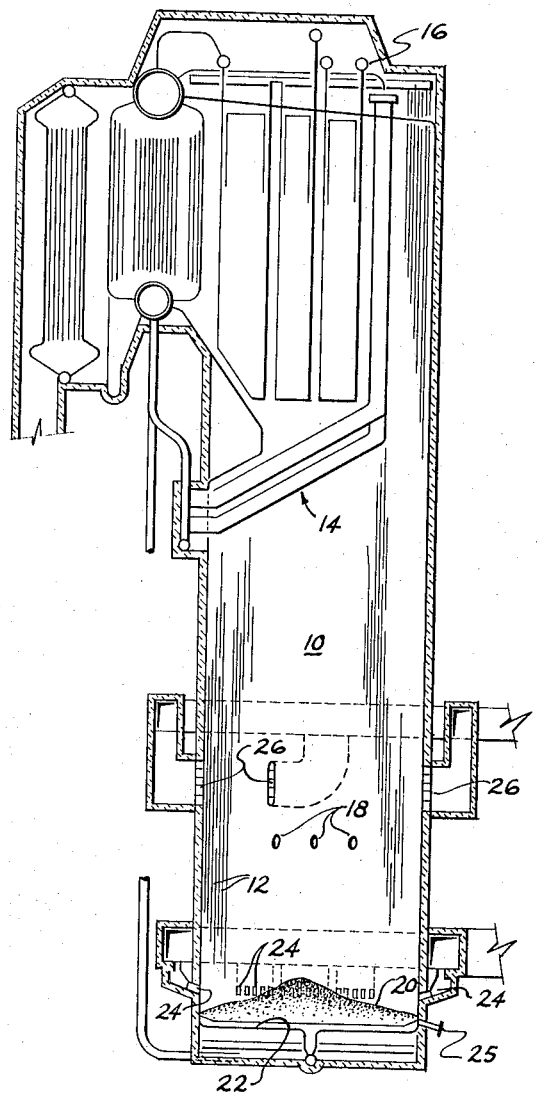
FIG. 1 is a sectional view of a chemical recovery unit embodying the present invention.

Referring now to the drawings, wherein like reference characters are used throughout to designate like elements, the illustrative and preferred embodiment of the invention as depicted therein includes a chemical recovery unit that has a furnace 10. The walls of this furnace are lined with steam generating tubes 12 that may be in tangent relation or may be in closely spaced relation with the space intermediate the tubes bridged by a fin. The tubes 12 that line the furnace 10 form part of the heat exchange surface of the chemical recovery unit with there being additional heat exchange surface identified generally as 14 at the upper region of the unit. The tubes 12 carry a mixture of steam and water at saturation temperature for the particular pressure at which the unit is operated with this mixture passing upwardly through these tubes. The illustrative steam generator is operative to produce steam at 950 pounds per square inch pressure with this steam being conveyed from the header 16 to a desired point of use and with this steam being superheated to a desired value such as 900° F.

Residual liquor obtained from the kraft pulping process is introduced into the furnace 10 through the nozzles 18. The liquor thus sprayed into the furnace descends downwardly toward the furnace bottom passing through an upwardly rising stream of combustion gases such that a majority of the moisture in the liquor is immediately evaporated with the solid particles falling downwardly through this rising combustion gas stream and forming a pile 20 on the hearth or bottom 22. A portion of the burnables are consumed during this descent through the furnace with additional burnables being consumed on the pile 20 and with the non-burnable chemicals being smelted and periodically withdrawn through the discharge spout 25.

Combustion supporting air is introduced into the furnace at two locations. The primary air is introduced through nozzles 24 spaced relatively close to the bottom as, for example, 3 feet above the furnace bottom, while the secondary air is introduced through the nozzles or ports 26 located above the liquor introduction nozzles 18.

Figure 3:
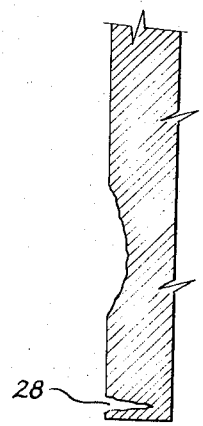
FIGS. 2 and 3 are detailed sectional views of the lower region of the chemical recovery furnace indicating particularly the regions wherein metal wastage of steam generating tubes is a problem at pressures of approximately 900 pounds per square inch steam pressure or above.
Figure 2:
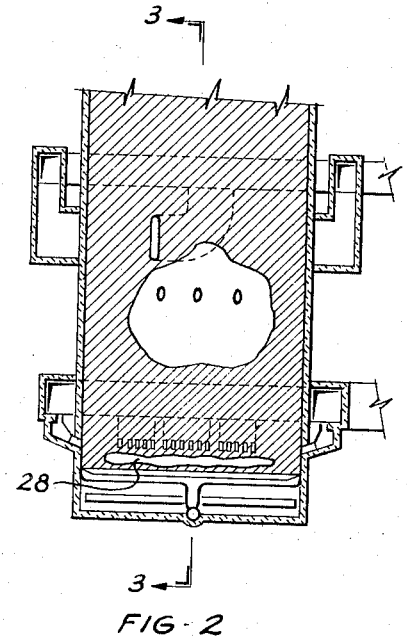

As previously mentioned chemical recovery units operating an approximately 900 pound per square inch steam pressure or above have encountered a serious metal wastage problem of the tubes 12 at the location below the primary air nozzles identified in FIG. 1 as 24. The particular location of this serious corrosion problem is identified in FIGS. 2 and 3 as the general area 28. The apparent reason for this is that with the higher pressures the saturation temperature within the tubes 12 is elevated which, in turn, causes the tube metal temperature to rise. The region immediately below the primary air ports 24 is a region of high heat absorption such that the tube metal temperature here is substantially elevated and, furthermore, it is at this location that the burning on the upper surface of the pile joins or contacts the side walls of the furnace. In any event and for whatever reason, serious tube metal wastage problems of the steam generating tubes on the upright furnace walls in units operating at the aforementioned steam pressure and above have been experienced.

This problem is extremely serious for several reasons one of which is that a tube rupture in a chemical recovery unit creates a very hazardous condition in that mixing water with the molten smelt in the bottom of the unit causes serious explosions which have created extensive property damage and been the cause of loss of life for many operating personnel. Moreover, replacement of the tubes in the lower region of the chemical recovery units is difficult since the lower region is liquid-tight so as to contain the molten smelt and, therefore, adjacent tubes or abutting fins are welded together to form a fluid-tight wall section.

Figure 4:
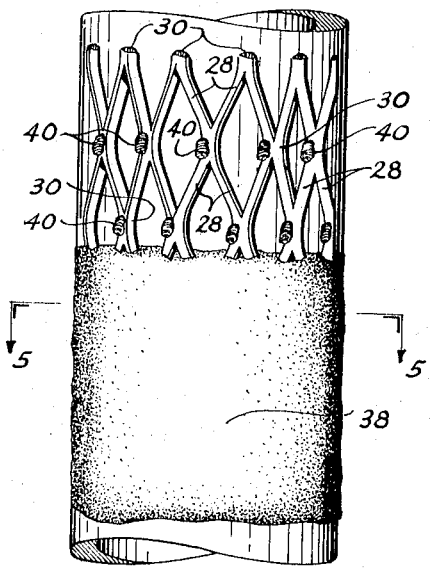
FIGS. 4 and 5 are detailed views showing the construction whereby a layer of refractory material is retained in position over the surfaces of the tubes which face inwardly of the furnace of the steam generating tubes at the region below the primary air ports.
Figure 5:
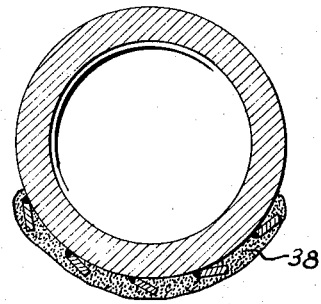
Figure 6:
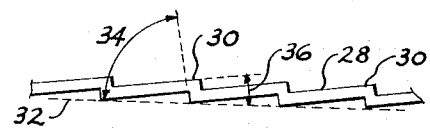

To overcome this problem of metal wastage of the steam generating tubes on the upright furnace walls at the location below the primary air nozzles 24, there is maintained, in accordance with the present invention, a layer of refractory on the surface of the tube directed inwardly of the furnace 10 at this location with this refractory being maintained in place in such a manner that it is securely retained in its proper relation with the tube and is suitably cooled to prevent deterioration thereof. For this purpose there is provided a perforate metallic sheet generally conforming to the tube surface in this region below the nozzles 24 and rigidly secured to the tubes. In the preferred embodiment this sheet is of expanded metal as illustrated in FIGS. 4, 5 and 6. This expanded metal is comprised of a series of strands 28 united at bonds 30, and it is formed such that the bonds 30 and the strands are set at a sharp angle to the plane of the sheet. To illustrate this, in FIG. 6 the plane of the sheet may be identified as 32 while the angle of the bond may be identified as 34 and the angle of the strand identified as 36. The purpose of this is so that portions of the strands of the expanded metal will be spaced from the tubes so that the refractory can flow intermediate the strand and the tube and thus when it hardens, it will be securely bonded in place with the expanded metal being embedded in the layer of refractory as shown in FIG. 5 where the refractory is identified as 38.

It is essential that the sheet material which secures the refractory to the tubes, i.e., the expanded metal should be fabricated of stainless steel for the reason that in operation, the refractory layer will gradually wear down so that portions of the expanded metal would be exposed to the severe action of the atmosphere and chemicals within the furnace. It has been found that if the expanded metal is of stainless steel (for example Type 304) that it will withstand these operating conditions. It should here be mentioned that the steam generating tubes lining the furnace walls cannot be made of stainless steel because of water side problems and particularly because of stress corrosion cracking caused through contact of the boiler water with the metal at elevated temperatures.

The expanded metal is welded to the surface of the tubes 12 by welds 40 at each of the bonds of the expanded metal. This has two effects, one of which is to securely fasten the expanded metal in place and the other of which is to provide good heat exchange between the expanded metal and the tube wall. This latter is necessary and desirable in order to keep the temperature of the expanded metal as low as possible which, in turn, keeps down the temperature of the refractory layer. Because of the nature of the expanded metal with the many strands and because of the many welds, cooling of the expanded metal has been found to be very effective. This is of importance since if the temperature of the expanded metal rises excessively and it comes into contact with the molten material within the furnace while at such an elevated temperature, it will deteriorate or waste away even though the material of the expanded metal is stainless steel. By welding each of the bonds of the expanded metal to the tube, satisfactory operation has been obtained with it being observed that the expanded metal has withstood the severe operating conditions within the furnace even when in direct contact with the furnace atmosphere and molten material therein.

In covering the tubes on the upright walls of the furnace below the primary air nozzles 24, the expanded metal is first welded into place and thereafter a layer of refractory is applied over this expanded metal to effectively form a layer extending entirely around the furnace at this region. This refractory is applied in a paste-like or semi-liquid form and allowed to harden. Satisfactory results have been obtained by utilizing an alumina silica base refractory bonding mortar which has the following analysis:

| | Percent |
|---|---|
| $SiO_2$ | 41.3 |
| $Al_2O_3$ | 49.08 |
| $Fe_2O_3$ | .2 |
| Alkali | 3.4 |
| Ign. loss | 6.0 |

In the operation of a chemical recovery unit embodying the present invention the refracory will wear down in time and the outer surface of the expanded metal will become exposed to the interior of the furnace. When this has happened, the thus exposed portion of the expanded metal has stood up well and has not wasted away. When the refractory has thus worn away, an additional coating or layer is applied over the remaining refractory and has adhered very well. Thus in a relatively simple and economic manner the problem of metal wastage at this location in the chemical recovery furnace has been alleviated.

While we have illustrated and described a preferred embodiment of our invention it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

What is claimed is:

1. A chemical recovery unit having an upright furnace into which black residual liquor produced from kraft pulping process is introduced for burning and smelting, said furnace having the inner surface of its upright walls lined with steam generating tubes forming part of a steam generating system operative to generate steam of at least 900 pounds per square inch, these walls having primary air induction ports therein spaced somewhat above the furnace bottom for directing air inwardly toward a pile of smelt and burnables on the bottom of the furnace, said steam generating tubes at the region below said ports having secured to their surface that is directed inwardly of the furnace a stainless steel metallic sheet-like means generally conforming to said tube surface, said metallic means having numerous relatively closely spaced openings dispersed throughout its area with a portion of this means being retained in spaced relation from the tubes such that a refractory in a semifluid state may be received therebetween, said metallic means being welded to the tube at numerous loactions throughout the area of said means and a layer of refractory material disposed over and about said metallic means such that the metallic means is embedded therein, whereby the metallic means retains said layer of refractory material in place intermediate said tube region and the interior of the furnace.

2. The chemical recovery unit of claim 1 wherein said metallic means comprises expanded metal wherein the strands and bonds are set at a sharp angle to the plane of the sheet of metal.

3. The chemical recovery unit of claim 1 wherein said refractory is an aluminum silica base refractory bonding mortar applied to said metal means after said metal means is in place.

4. In combination an upright furnace into which the residual liquor obtained in the kraft pulping process is introduced at a predetermined location above the furnace bottom such that within said furnace the liquor is dried, the burnables therein burned, and the nonburnable chemicals smelted with there collecting on the bottom of the furnace during operation molten chemical and burnables, a steam generating system including steam generating tubes lining the upright walls of the furnace with said system being effective to produce steam at least at 900 pounds per square inch pressure, said upright walls of said furnace having primary air ports formed therein close to but spaced above the furnace bottom to direct air onto said burnables and molten chemicals collected on the furnace bottom, the region of the steam generating tubes below said primary air ports having disposed and retained thereon a high temperature refractory protection, said refractory protection being retained in place by stainless steel sheet means conforming to the inwardly directed portions of the tubes in said region and having numerous openings distributed throughout its area, said sheet means being secured to the tubes at numerous locations throughout the area of the means with a portion of the sheet means being spaced from the tubes such that the refractory can be disposed about this portion of the sheet means to securely bond the refractory in place.

5. The organization of claim 4 wherein said stainless steel sheet means is expanded metal so formed that numerous of the strands thereof are spaced from the tube, said expanded metal being welded to the tubes at the bonds of the expanded metal.

References Cited by the Examiner

UNITED STATES PATENTS

| 2,789,881 | 4/1957 | Hochmuth | 122—7 |
| 3,048,154 | 8/1962 | Braddy | 122—7 |
| 3,139,866 | 7/1964 | Lumm et al. | 122—6 |

KENNETH W. SPRAGUE, *Primary Examiner.*